United States Patent
Karabulut

(10) Patent No.: US 7,546,463 B2
(45) Date of Patent: Jun. 9, 2009

(54) METHOD AND SYSTEM FOR DELEGATING AUTHORITY IN AN ONLINE COLLABORATIVE ENVIRONMENT

(75) Inventor: Yuecel Karabulut, Dortmund (DE)

(73) Assignee: SAP AG, Walldorf (DE)

( * ) Notice: Subject to any disclaimer, the term of this patent is extended or adjusted under 35 U.S.C. 154(b) by 868 days.

(21) Appl. No.: 11/001,435

(22) Filed: Nov. 30, 2004

(65) Prior Publication Data
US 2006/0117179 A1 Jun. 1, 2006

(51) Int. Cl.
*H04L 9/00* (2006.01)
(52) U.S. Cl. .................. 713/175; 713/156; 713/153; 726/10
(58) Field of Classification Search .............. 726/10
See application file for complete search history.

(56) References Cited

U.S. PATENT DOCUMENTS

| | | | |
|---|---|---|---|
| 6,233,577 B1* | 5/2001 | Ramasubramani et al. | 707/9 |
| 7,386,726 B2* | 6/2008 | Gehrmann et al. | 713/175 |
| 2002/0161999 A1* | 10/2002 | Gunter et al. | 713/168 |
| 2003/0115342 A1 | 6/2003 | Lortz | |
| 2003/0145223 A1* | 7/2003 | Brickell et al. | 713/201 |

FOREIGN PATENT DOCUMENTS

GB 2 357 228 A 6/2001

OTHER PUBLICATIONS

Yuh-Jong Hu, Some Thoughts on Agent Trust and Delegation, May 2001, ACM, pp. 489-496.*
Freudenthal E et al: "dRBAC: Distributed Role-Based Access Control for Dynamic Coalition Environments", Proceedings of the 22nd. International Conference on Distributed Computing Systems. ICDCS 2002. Vienna, Austria, Jul. 2-5, 2002, International Conference on Distributed Computing Systems, Los Alamitos, CA: IEEE Comp. Soc, US, vol. Conf. 22, Jul. 2, 2002, pp. 372-381, XP010595553.
Castelluccia G Montenegro C: Securing Group Managment in 1Pv6 with Cryptographically Generated Addresses; draft-irtf-gsec-sgmv6-00.txt, IETF Standard-Working Draft, Internet Engineering Task Force, IEFT, CH, Feb. 2001, XP015003726.
Paajarvi First Hop Ltd J: "XML Encoding of SPKI Certificates", IETF Standard-Working-Draft, Internet Engineering Task Force, IETF, CH, Mar. 2000, XP015033614.

* cited by examiner

*Primary Examiner*—Nasser G Moazzami
*Assistant Examiner*—Fikremariam Yalew
(74) *Attorney, Agent, or Firm*—Blakely, Sokoloff, Taylor & Zafman LLP

(57) ABSTRACT

A method and system to delegate an authority to access collaborative resources are provided. The system enables a participant to re-delegate the authority to another participant by an authorization certificate. A chain of authorization certificates is established along with the re-delegation of the authority from one participant to another. The participant requesting access to the collaborative resources is requested to provide the owner with the chain of authorization certificates for verification. Therefore, the re-delegation process may be performed without the need to notify the owner and yet without comprising the security of the collaborative resources.

7 Claims, 7 Drawing Sheets

| ISSUER 71 | HOLDER 72 | RE-DELEGATION FLAG 73 | OPERATION 74 | VALID PERIOD 75 | |
|---|---|---|---|---|---|
| CLIENT 60 | CLIENT 62 | TRUE | READ (36, 38, 40, 42) | V1 | — 76 |
| CLIENT 62 | CLIENT 64 | TRUE | READ (36, 38, 40) | V2 | — 77 |
| CLIENT 64 | CLIENT 66 | FALSE | READ (36, 38) | V3 | — 78 |

| ISSUER 71 | HOLDER 72 | RE-DELEGATION FLAG 73 | OPERATION 74 | VALIDITY 75 | |
|---|---|---|---|---|---|
| | | | | | — 70 |
| CLIENT 60 | CLIENT 62 | TRUE | READ (36, 38, 40, 42) | 2002 - 2006 | — 76 |
| CLIENT 62 | CLIENT 64 | TRUE | READ (36, 38, 40) | 2003 - 2006 | — 77 |
| CLIENT 60 | CLIENT 64 | TRUE | READ (36, 38, 40) | 2003 - 2006 | — 140 |
| CLIENT 64 | CLIENT 66 | FALSE | READ (36, 38) | 2004 - 2005 | — 78 |
| CLIENT 60 | CLIENT 66 | FALSE | READ (36, 38) | 2004 - 2005 | — 142 |

FIGURE 6

METHOD AND SYSTEM FOR DELEGATING AUTHORITY IN AN ONLINE COLLABORATIVE ENVIRONMENT

FIELD OF THE INVENTION

An embodiment relates generally to the field of online collaboration. More particularly, an embodiment relates to a method and a system for establishing authority to access resources in electronic environments, e.g., online meetingplaces, virtual organizations and electronic communities.

BACKGROUND OF THE INVENTION

The Internet and the World Wide Web ("Web") have changed the landscape of information delivery and affected numerous aspects of life. One benefit of this technological development is the ability to conduct business transactions globally via the Internet. As the volume of commerce conducted over the network continues to increase, collections of business units or organizations are working together to pool resources and expertise in order to achieve a common business objective. Organizations are sharing services and resources across enterprise boundaries in order to undertake collaborative projects that they could not undertake individually, or to offer composed services that could not be provided by individual organizations.

A growing array of technologies has emerged to help bridge the gaps between people, time and geography in such collaborative environments. These include both synchronous and asynchronous technologies such as email, web conferencing and instant messaging. These technologies often include the ability to display and share application files. Presentations, spreadsheets and documents are shared among participants without requiring the participants to have these files individually installed on their system.

However, such online collaboration is threatened by security issues such as data eavesdropping, data tampering and entity repudiation. Often, customer information and financial account numbers are stolen through data eavesdropping, whereby data remains intact but privacy is compromised. In a data-tampering event, the data is altered or replaced in a transaction. For example, someone can change the amount to be transferred to and from a bank account. In entity repudiation, the identity of the participant is compromised. Often, data is passed to a person who poses as the intended recipient.

Many security and trust management technologies have been developed to address the demand for secured online collaboration. One common security approach includes using the Public Key Infrastructure (PKI), which is the standard for public-key cryptographic security and is used to ensure the security of digital certificates. PKI infrastructure provides these security measures—user authentication, data integrity and confidentiality. With the PKI infrastructure, a pair of keys is used to provide strong authentication and encryption services. The key pair is associated with a user by the use of a certificate containing the user's public key and attributes associated with the user. Often, the certificate is digitally signed by a trusted third party, such as the Certification Authority (CA), and is valid only for a certain period of time. The public key associated with and certified by the certificate works with the corresponding private key possessed by the entity identified by the certificate. The PKI infrastructure is able to verify the identities of the participants through the certificate and maintain data integrity with the encryption technology.

SUMMARY OF THE INVENTION

According to one aspect of the present invention, there is provided a method to delegate an authority to a recipient for accessing protected resources. The method includes building an authorization certificate; establishing a chain of authorization certificates with each re-delegation; and verifying an access request for the protected resources.

According to a further aspect of the present invention, there is provided a method to verify the chain of authorization certificates includes comparing a first and a second certificate, the first and the second certificate being a first and a second authorization certificate of the chain of authorization certificates respectively. The comparing the first and the second certificate further includes determining a sequence of issuerholder; determining a re-delegation authority of the second certificate is not permitted when the re-delegation authority of the first certificate is not permitted; determining a type of operation performed of the second certificate is a set or a subset of the first certificate; and determining a valid period of the second certificate is a set or a subset of the first certificate.

Other features of the present invention will be apparent from the accompanying drawings and from the detailed description that follows.

BRIEF DESCRIPTION OF THE DRAWINGS

An embodiment of the present invention is illustrated by way of example and not limitation in the figures of the accompanying drawings, in which like references indicate similar elements and in which:

FIG. 3 is a block diagram of an exemplary embodiment of an authorization certificate of a participant;

FIG. 6 is a block diagram of an exemplary embodiment of a verification certificate derived from a chain of authorization certificates.

DETAILED DESCRIPTION

A method and system for delegating authority in a collaborative environment are described. In the following description, for purposes of explanation, numerous specific details are set forth in order to provide a thorough understanding of an embodiment of the present invention. It will be evident, however, to one skilled in the art that the present invention may be practiced without these specific details.

Platform Architecture

Figure 1:
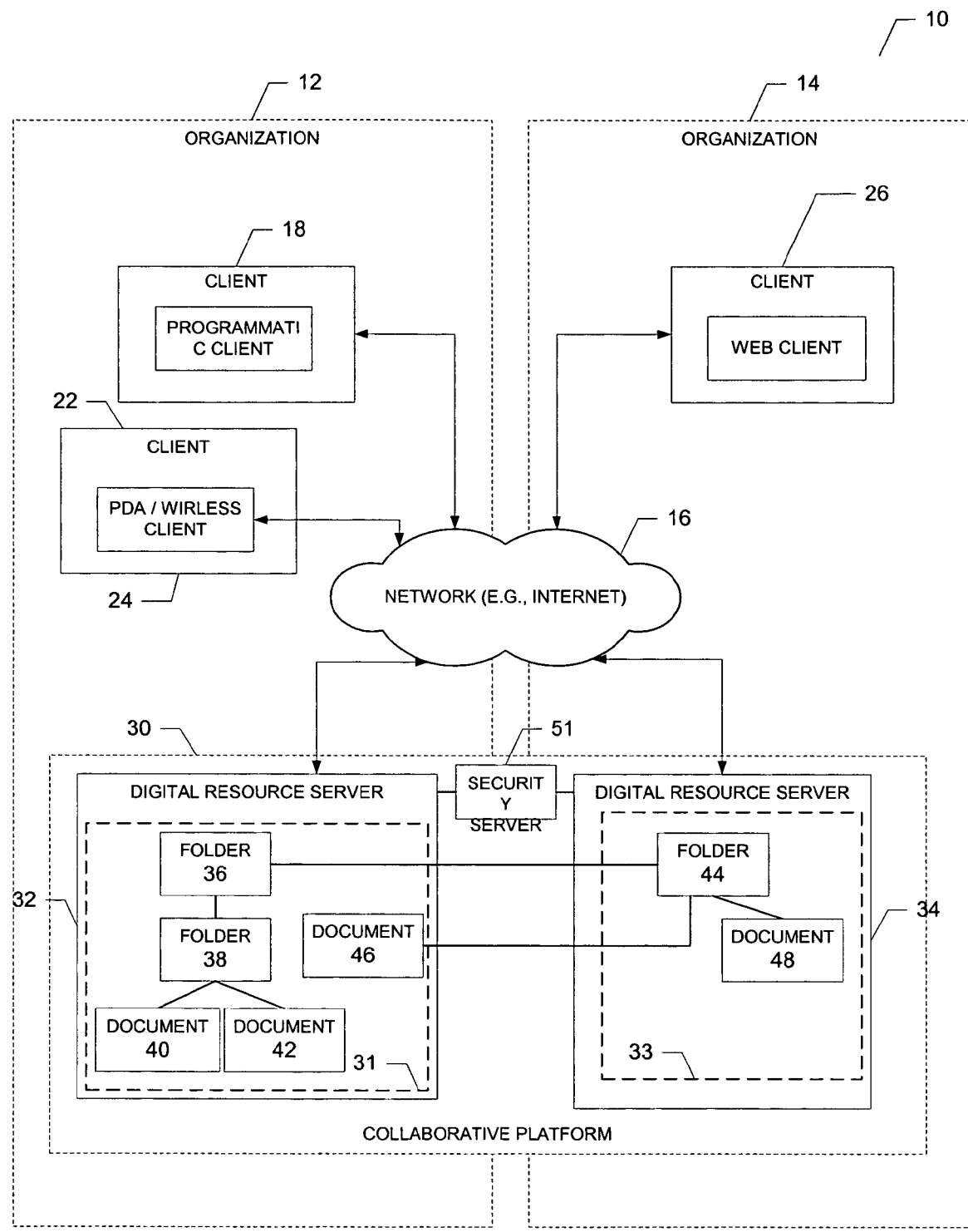
FIG. 1 is a network diagram depicting a system for delegating authority to a participant for accessing collaborative resources in accordance with one exemplary embodiment of the present invention.

FIG. 1 is a network diagram depicting a system 10, according to one exemplary embodiment of the present invention, having a client-server architecture. A collaborative platform 30 provides collaborative resources 31, 33, via a network 16 (e.g., the Internet) to one or more clients in a first organization 12 and a second organization 14.

In one embodiment, the collaborative platform 30 contains digital resource servers 32 and 34 belonging to the first organization 12 and the second organization 14 respectively. The digital resource servers 32 and 34 contain collaborative resources 31, 33 which are shared between the first organization 12 and the second organization 14. The digital resource server 32 of the first organization 12 contains a folder 36, a sub-folder 38 and documents 40, 42 and 46. The documents 40 and 42 are further classified in to sub-folder 38. The digital resource server 34 hosts a folder 44 which contains a document 48.

Virtually, the folder 36 is configured as the parent of folder 44 though folders 36 and 44 are located at different location, such as in digital resource servers 32 and 34 respectively. Similarly, the folder 44 of the second organization 14 is the virtual parent of document 46 of the first organization 12. Therefore, when a client has access permission to folder 44, the client is able to view documents 46 and 48 in the folder 44.

In one embodiment, the digital resource servers 32 and 34 are coupled to a security server 51. The security server 51 provides the function of verifying a client who requests access to the collaborative resources. In one embodiment, the security server 51 authenticates the identity of the client and verifies the client's right to perform certain operations on the collaborative resources.

FIG. 1 further illustrates that the clients 18, 22 and 26 of organizations 12 and 14 contact the collaborative platform 30 via the network 16 (e.g., Internet). According to one exemplary embodiment of the present invention, the clients 18, 22 and 26 use an authorization certificated provided by the security servers 50 and 52 respectively. The authorization certificate expresses a permission to access the collaborative resources.

In this exemplary embodiment, the collaborative resources 31, 33 shown in FIG. 1 are centrally located in the digital resource server 32 and 34. The present invention is not limited to such architecture and the collaborative resources 31, 33 could be located in a distributed architecture system (e.g., at the client).

In addition, while FIG. 1 shows the collaborative platform 30 being managed jointly by the first organization 12 and the second organization 14, the collaborative platform 30 may be provided by a third party entity such as an online collaborative provider.

Collaborative Platform

Figure 2:
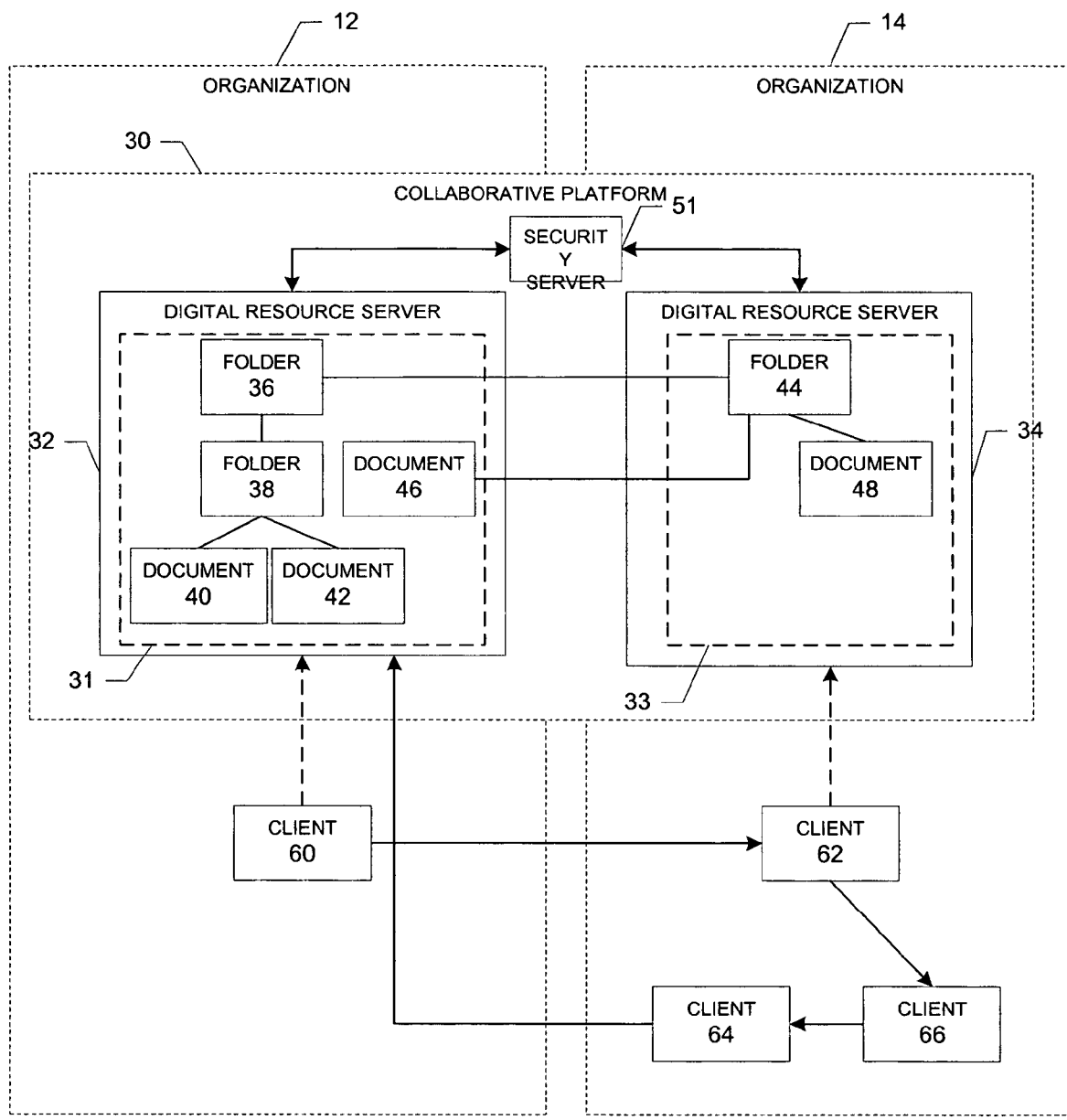
FIG. 2 is a network diagram depicting a collaborative platform for a participant to access collaborative resources in accordance with another exemplary embodiment of the present invention.

FIG. 2 is a network diagram depicting a collaborative platform 30 for a client to access collaborative resources 31 in accordance with another exemplary embodiment of the present invention.

In one embodiment, a client 60 of the first organization 12 is the owner of the digital resource server 32 and collaborative resources 31. The client 60 has the authority to permit another client, such as clients 62, 64, 66 of the second organization 14, to access the folders 36, 38 and documents 40, 42, 46. Similarly, the client 62 of the second organization 14 is the administrator of the digital resource server 34.

According to one exemplary embodiment of the present invention, the client 60 provides the client 62 with the permission to re-delegate the authority to access the collaborative resources 31 to another entity, e.g., clients 62, 66, 64. The advantage of the present embodiment is that the client 60, owner of the collaborative resources 31, need not know to whom the client 62 has re-delegated the authority. The client 60 only authenticates the chain of re-delegation when receiving a request to access the collaborative resources 31.

As illustrated in FIG. 2, the client 62, in turn, re-delegates to client 66 the authority to access the collaborative resources 31. In addition, the client 62 permits client 66 to also re-delegate the access authority to another client such as client 64.

When the client 64 submits a request to access the digital resource 32, the client 60 requires client 64 to prove that the re-delegation authority originates from client 60 and has propagated through a chain of authorized entities. In addition, the client 60 verifies the type of operation that the client 64 is allowed to perform. For example, if the client 64 requests to perform a write operation, the client 60 verifies that client 64 has inherited from client 66 who has in turn received the write permission from client 62.

Authorization Certificate

FIG. 3 illustrates an exemplary embodiment of the authorization certificate 70 for delegating right to access the collaborative resources 31 as presented in FIG. 2. In this embodiment, the authorization certificate 70 includes five data fields—an issuer 71, a holder 72, a re-delegation flag 73, an operation 74 and a valid period 75.

The issuer 71 is an entity granting the authority to access the collaborative resources 31 while the holder 72 is the entity receiving the authority. When the holder 72 re-delegates the authority, the holder 72 becomes the issuer 71 in a subsequent copy of the authorization certificate 70.

The re-delegation flag 73 registers whether the holder 72 has been given the right to re-delegate the authority to access the collaborative resources 31. The issuer 71 may set the re-delegation flag 73 false to disable the holder 72 from re-delegating the authority. It will be noted that when an authorization certificate 70 contains a re-delegation flag 73 that is set to false, the subsequent entity is unable to re-delegate the authority.

The operation field 74 contains a data structure which represents a set of access permissions such as read file only, write file only, read and write file. The valid period field 75 indicates the time period during which the authorization certificate 70 is valid. In other words, the authorization certificate 70 expires after a period of time and becomes unusable.

The authorization certificates 70, 76, 77 and 78 are illustrated with the example in FIG. 2. In the example of authorization certificate 76, the issuer 71 is client 60 who is the owner of the collaborative resources 31. The collaborative resources 31 managed by client 60 include folders 36, 38 and documents 40, 42, 46. The holder 72 is client 62 whom the client 60 has given permission to access the collaborative resources 31. However, the client 62 is only given read-only access to folders 36, 38 and documents 40, 42. The document 46 is not present in the authorization certificate 76 and therefore, the document 46 is invisible to the client 62. The authorization certificate 76 is valid for a time period of "V1", after which the authorization certificate 76 expires automatically.

As the re-delegation flag is set to true in the authorization certificate 76, the client 62 is able to re-delegate to another entity the permission it holds for accessing the resources. This is further illustrated in the authorization certificate 77. The client 62, who is the holder 72 in the authorization certificate 76 becomes the issuer 71 in the authorization certificate 77. Client 64 is the holder 72, meaning that the client 62 has re-delegated the authority to access the collaborative resources 31 to client 64. However, client 64 is only permitted to read folders 36, 38 and document 40. The client 64 is not given permission to access document 42 which is accessible by client 62. Therefore, the client 62 is able to restrict the type of operation that client 64 is able to perform without the need to inform the owner, i.e., client 60.

Similarly, client 64 has the permission to re-delegate to another entity the authority to access the collaborative resources 31. The client 64 issues the authorization certificate 78 to client 66. However, the client 66 is not permitted to re-delegate to another entity the authority to access the collaborative resources as the re-delegation field is set to false. In addition, the client 66 is limited to performing read operations on folders 36 and 38. Accordingly, client 66 is only aware that folder 36 is the parent of folder 38, which contains documents 40 and 42. The client 66 is unable to access the documents 40 and 42.

The authorization certificates 76, 77 and 78 illustrate a chain of authorization certificates created by authorized entities, clients 60, 62, 64. It will be noted that the issuer 71 and holder 72 of each of the authorization certificates, 76, 77 and 78, establish a sequence of the entities re-delegating the authority. For example, client 62, the holder 72 of the authorization certificate 76 becomes the issuer 71 of authorization certificate 77. Client 64 who is the holder 72 of authorization certificate 77 becomes the issuer 71 of authorization certificate 78. In one embodiment of the present invention, the sequence of issuer 71-holder 72 identifies that a proper re-delegation channel has been established.

Delegation Protocol

Figure 4:
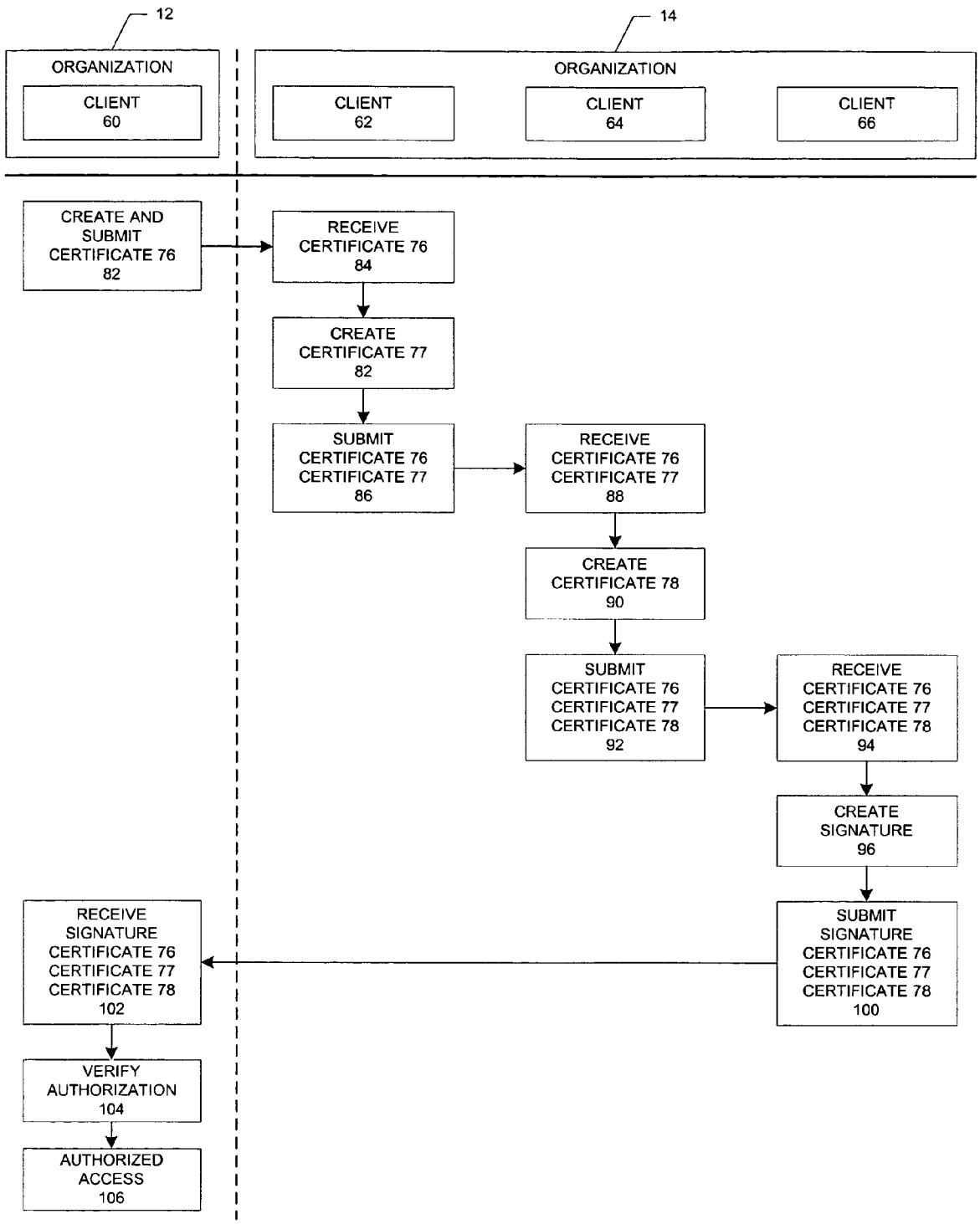
FIG. 4 is an interactive flow chart illustrating a method, according to one exemplary embodiment of the present invention, to delegate authority for accessing collaborative resources.

FIG. 4 is an interaction flow chart illustrating a method, according to an exemplary embodiment of the present invention, to delegate authority using the authorization certificate 70 described in FIG. 3.

In one exemplary embodiment of the present invention, the delegation protocol consists of two phases—one for delegating authority to access the collaborative resources 31, 33 and another for requesting an access to the collaborative resources 31, 33.

Delegation Phase

Starting at block 82, the client 60 of the first organization 12 creates an authorization certificate 76 which is submitted to the client 62 of the second organization 14. In one embodiment, the authorization certificate 76 allows the client 62 to access the collaborative resources 31 managed by the client 60. In addition, the authorization certificate 76 permits the client 62 to re-delegate the authority to another entity.

The client 62 receives the authorization certificate 76 at block 84 and decides to delegate to client 64 the authority to access the collaborative resources 31. The client 62 creates an authorization certificate 77 at block 82. As illustrated earlier in FIG. 3, the authorization certificate 77 contains the data (client 62, client 64, true, read(36,38,40), v3). As the re-delegation flag is set to true, client 64 can in turn re-delegate to another entity the authority to access the collaborative resources 31. To complete the delegation phase, the client 62 submits to the client 64 the authorization certificates 76 he receives from client 60 and the authorization certificate 77 created by him.

The client 64 receives the authorization certificates 76 and 77 at block 88. The client 64 has been authorized to re-delegate the right to access the collaborative resources 31. The third client 64 creates an authorization certificate 78 at block 90 with the client 66 as the holder. The certificates 76, 77 and 78 are then submitted to the fourth client 66 at block 92.

The protocol as described above consists of the delegation phase whereby the authority to access collaborative resources is propagated from the client 60, who manages the collaborative resources 31 in the digital resource server 32, to the client 66. The next phase of the protocol, which handles the requesting of the collaborative resources 31, is described below.

Requesting Phase

In one exemplary embodiment of the present invention, the requesting phase of the protocol provides a mechanism to verify the identity of the requestor and another mechanism to authenticate the authority that the requestor is delegated with.

In one embodiment, the present invention uses a PKI digital signature to confirm the identity of the requestor. Basically, the requestor uses a private key to digitally sign a message. Unlike the handwritten signature, this digital signature is different every time it is made. A unique mathematical value (first hash value) determined by the content of the message is calculated using a "hashing" or "message authentication" algorithm, and then this value is encrypted with the private key, thereby, creating the digital signature for this specific message. The encrypted value is either attached to the end of the message or is sent as a separate file together with the message. The public key corresponding to this private key may also be sent with the message, either on its own or as part of a certificate. The receiver of the digitally signed message then uses the correct public key to verify the signature. The encrypted value is decrypted to obtain the first hash value. Next, using the hashing algorithm, the message is recalculated to obtain a second hash value. If the second hash value matches the first hash value, it can be concluded that the entity controlling the private key corresponding to the public key sent the information. In addition, the information has not been altered since it was signed.

At block 96, the client 66 creates a PKI encrypted signature. In one embodiment, the client 66 uses the operation field 74, "READ(36, 38)", from the authorization certificate 78 as the message to be encrypted. The encrypted signature is submitted to the first client 60 at block 100. In addition, a chain of authorization certificates, 76, 77, 78, are submitted.

At block 102, the client 60 receives the encrypted signature and the chain of authorization certificates, 76, 77, 78. These are further verified at block 105. The digital signature is decrypted to confirm the identity of the client 66. The process to verify the authority of the client 66 is further discussed in the section below.

If the verification process is successful, the client 66 is allowed to perform the necessary operation at block 106. In this example, the client 66 is permitted to perform read-only operations on folders 36 and 38.

Verification Process

Figure 5:
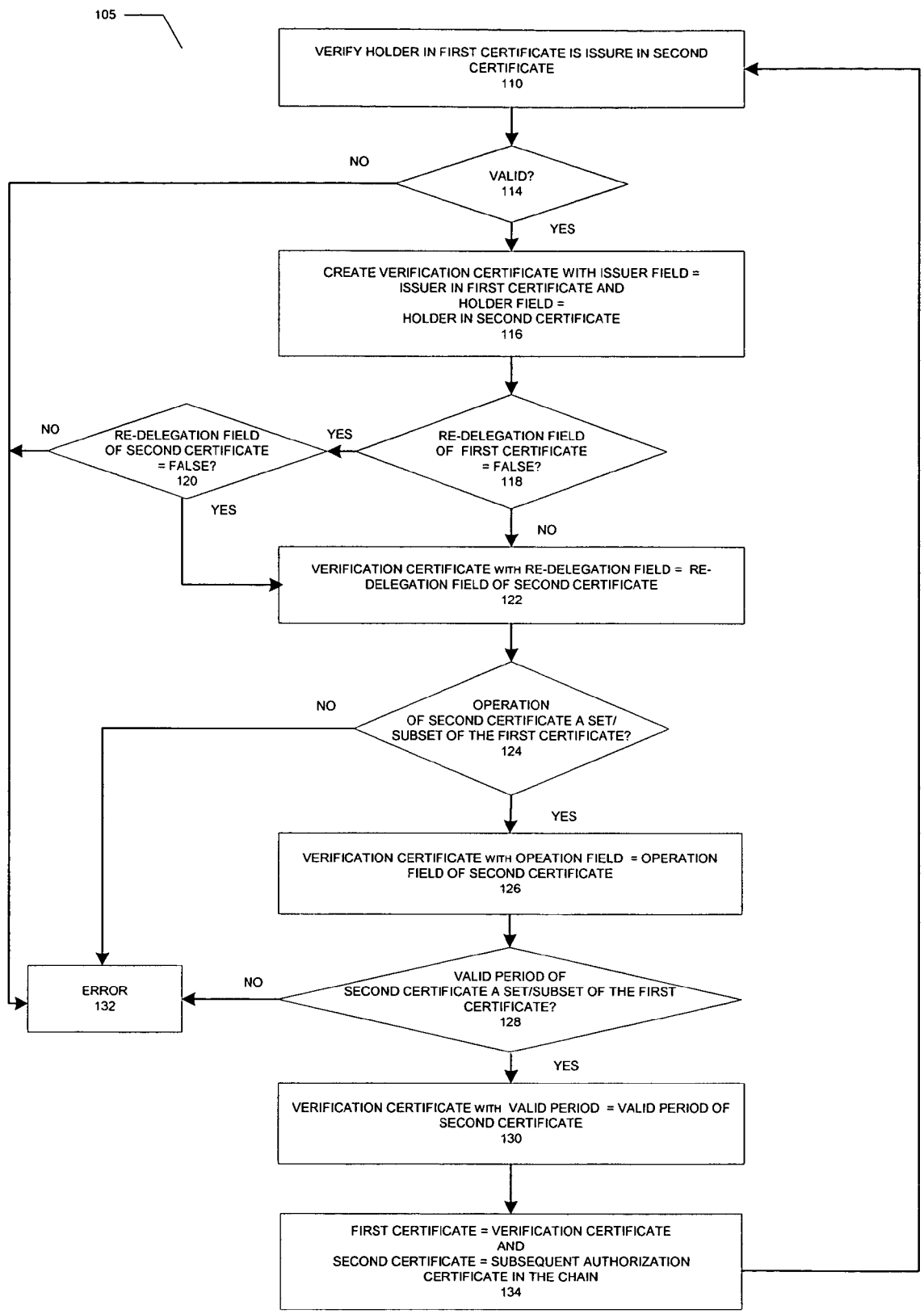
FIG. 5 is a flow chart illustrating one approach of establishing the delegation authority of a participant in accordance with an exemplary embodiment of the present invention.

FIG. 5 is a flowchart diagram illustrating the verification process 105 for authenticating the authority of the requestor to access the collaboration resources 31, in accordance to one exemplary embodiment of the present invention. The verification process 105 includes deriving a verification certificate from a chain of authorization certificates. In one embodiment, the verification certificate contains the same data structure as the authorization certificate 70.

The verification process 105 starts at block 110 wherein a first certificate is compared with a second certificate to derive a verification certificate. The verification process 105 starts with the first and the second certificate being a first and a second authorization certificate of a chain of authorization certificates. In the subsequent process, the first certificate is the verification certificate created from the previous verification process 105 and the second certificate is a third authorization certificate.

At block 110, the first certificate is compared with the second certificate to establish a sequence of issuer-holder. For example, the holder 72 of the first authorization certificate is also the issuer 71 of the second authorization certificate. Any deviation from the issuer-holder sequence is an indication that the authority of the requestor has been improperly delegated.

If the sequence of issuer-holder is correct, at the next block 116, the verification certificate is created with the issuer 71 and the holder 72 set to the issuer 71 of the first certificate and the holder 72 of the second authorization certificate respectively.

In the next block 118, the verification process 105 examines the re-delegation field of the first authorization certificate. It is noted that in a chain of authorization certificates 70, if the first authorization certificate does not have the re-delegation authority, the subsequent authorization certificate will not have such re-delegation authority. Therefore, if the re-delegation field of the first certificate is false, the re-delegation field of the second authorization certificate is further verified at block 120. In the case where the re-delegation field of the second authorization certificate is true, the second authorization certificate is invalid. Otherwise, the re-delegation field of the verification certificate is assigned the value of the re-delegation field of the second authorization certificate at block 122.

At block 124, the operation field 74 is verified. As established earlier, an entity cannot perform an operation beyond the scope of what the parent entity is entitled to. For example, if the parent entity is given read-only authority, the parent entity cannot assign a read-and-write or write-only authority to another entity. At block 124, the operation field 74 of the second certificate is examined to determine whether the operation field 74 is a set or subset of the first certificate. At the next block 126, the operation field of the verification certificate is assigned the value of the operation field of the second certificate.

The valid period 75 of the second certificate is verified at block 128. Similarly, an entity cannot be delegated with a valid period 75 exceeding the parent entity. At block 128, the valid period 75 of the second certificate is analyzed to determine whether the valid period 75 is a set or subset of the first certificate. In addition, the verification certification takes the valid period 75 of the second certificate at block 130.

The process 105 is repeated for the chain of authorization certificate with the verification certificate as the first certificate and the next authorization certificate as the second certificate at block 134.

FIG. 6 illustrates some exemplary verification certificates created based on the verification process 105 described in FIG. 5. The verification process 105 begins with authorization certificates 76, 77 which are part of a chain of authorization certificates, 76, 77, 78. The holder 72 of the authorization certificate 76 is determined whether the holder 72 matches the issuer 71 of the authorization certificate 77. In this example, client 62 is the holder 72 and the issuer 71 of the authorization certificates 76 and 77 respectively. Therefore, the verification certificate 140 has client 60 as the issuer 71 and client 64 as the holder 72.

The next phase verifies the re-delegation flag 73. In this example, the authorization certificate 77 contains a permission to re-delegate the authority to another entity. In order for the authorization certificate 77 to contain such a permission, the authorization certificate 76, which is the parent of the authorization certificate 77, must also contain the same permission. The authorization certificate 76 has re-delegation flag 73 set to true. Therefore, the authorization certificate 77 contains a valid re-delegation flag 73. The verification certificate 140 is then assigned the re-delegation flag 73 of the authorization certificate 73.

Next, the verification process 105 examines the authority to perform certain operations on the collaborative resources. The authorization certificate 77 contains the operation of READ(36, 38, 40) which is a subset of the authorization certificate 76, READ(36, 38, 40, 42). The authorization certificate 77 contains a valid operation and the verification certificate 140 is assigned with the operation 74 of the authorization certificate 77.

Similarly, the valid period 75 of the authorization certificates 76, 77 are compared. In this example, the authorization certificate 77 has a valid period 75 of (2003-2006) which is a subset of that of the authorization certificate 76, (2002-2006). Therefore, the valid period of authorization 77 is correct and the verification certificate 140 is assigned the valid period 75 of the authorization certificate 77.

The verification process 105 is repeated to compare the verification certificate 140 with the authorization certificate 78 to derive the authorization certificate 142. It will be noted that the issuer 71 of the verification certificate 140 captures the original entity, client 60, who first re-delegated the authority to other entities.

System Platform

Figure 7:
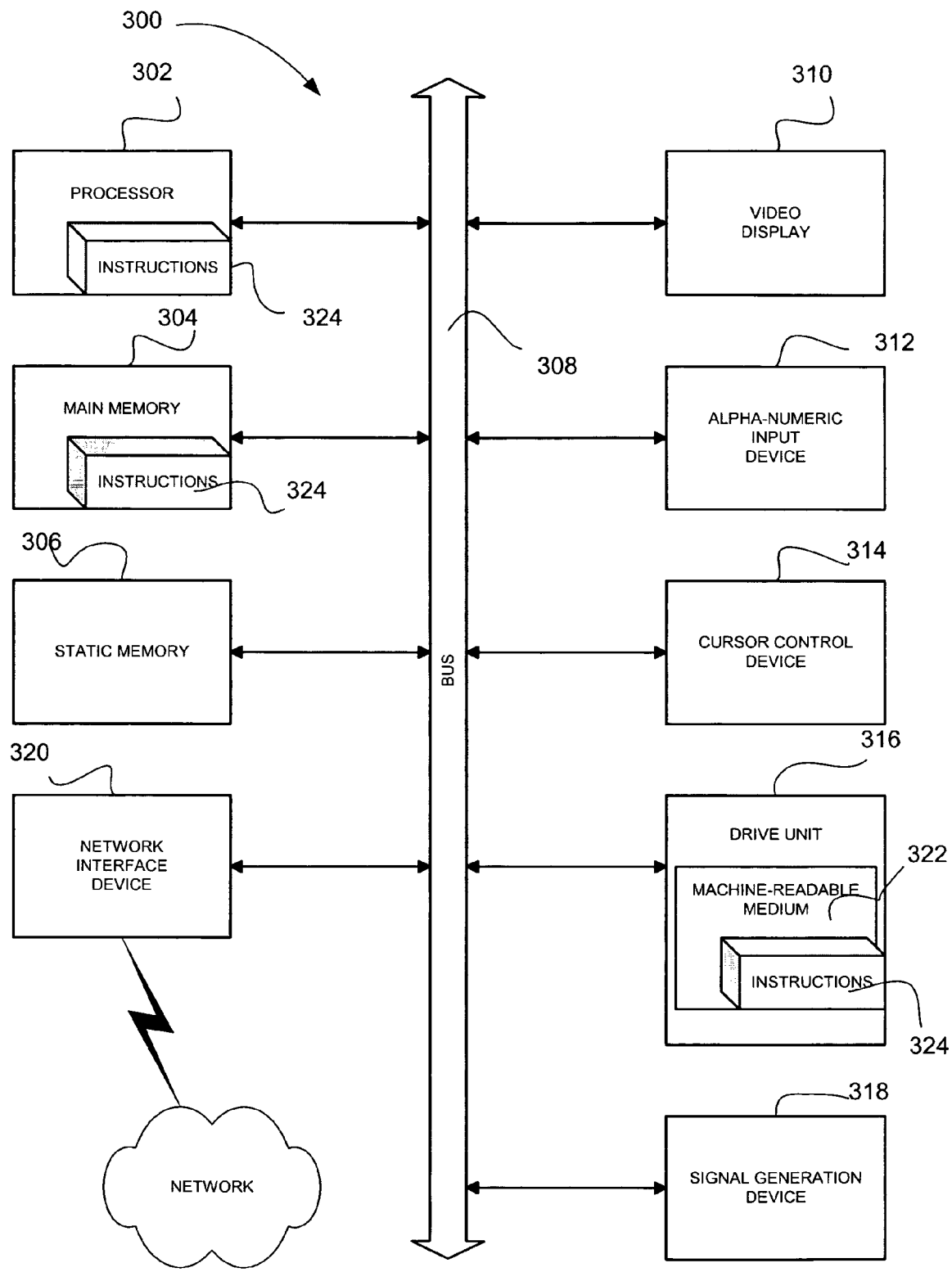
FIG. 7 is a diagrammatic representation of a machine within which a set of instructions, for causing the machine to perform any one of methods described herein, may be executed.

FIG. 7 shows a diagrammatic representation of a machine in the exemplary form of a computer system 702 within which a set of instructions for causing the machine to perform any one or more of the above methodologies may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 702 includes a processor 704 (e.g., a central processing unit (CPU) a graphics processing unit (GPU) or both), a main memory 706 and a static memory 708, which communicate with each other via a bus 728. The computer system 702 may further include a video display unit 712 (e.g., a liquid crystal display (LCD) or a cathode ray tube (CRT)). The computer system 702 also includes an alphanumeric input device 714 (e.g., a keyboard), a cursor control device 716 (e.g., a mouse), a disk drive unit 718, a signal generation device 720 (e.g., a speaker) and a network interface device 710

The disk drive unit 718 includes a machine-readable medium 724 on which is stored one or more sets of instructions (e.g., software 722) embodying any one or more of the methodologies or functions described herein. The software 722 may also reside, completely or at least partially, within the main memory 706 and/or within the processor 704 during execution thereof by the computer system 702, the main memory 706 and the processor 704 also constituting machine-readable media.

The software 722 may further be transmitted or received over a network 01 via the network interface device 710.

While the machine-readable medium 724 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to delegate authority in an online collaborative environment has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for delegating an access authority for accessing protected resources over a network of computer systems, the method including:
    building an authorization certificate;
    issuing the authorization certificate to a plurality of participants to re-delegate the access authority, each of the plurality of participants including a computer system;
    at each re-delegation, establishing a chain of authorization certificates, wherein establishing the chain of authorization certificates includes communicating a first authorization certificate between a first participant and a second participant, the first participant delegating the access authority to the second participant, determining re-delegation authority of the second participant, creating a second authorization certificate permitting the second participant to re-delegate the access authority to a third participant, and communicating the first and the second authorization certificates between the second participant and the third participant, the second participant delegating the access authority to the third participant;
    receiving an access request for the protected resources from the third participant; and
    verifying the access request for the protected resources, wherein verifying includes authenticating the third participant providing the access request, receiving the chain of authorization certificates, and verifying the chain of authorization, wherein authenticating the third participant includes authenticating a type of operation to be performed by the third participant.

2. The method of claim 1, wherein the type of operation includes at least one of a read-and-write operation, a read-only operation, and a write-only operation, on the protected resources.

3. The method of claim 1, wherein verifying the chain of authorization certificates includes comparing the first and second authorization certificates.

4. A system comprising:
    a server computer system having a processor coupled with a storage medium, the server computer system including a system for delegating an access authority for accessing protected resources having
    a certification module to build an authorization certificate;
    a communication module to establish a chain of authority certificates with each re-delegation, wherein establishing the chain of authorization certificates includes communicating a first authorization certificate between a first participant and a second participant, the first participant delegating the access authority to the second participant, determining re-delegation authority of the second participant, creating a second authorization certificate permitting the second participant to re-delegate the access authority to a third participant, and communicating the first and the second authorization certificates between the second participant and the third participant, the second participant delegating the access authority to the third participant; and
    a security module to receive an access request for the protected resources from the third participant, and verify the access request for the protected resources, wherein verifying includes authenticating the third participant providing the access request, receiving the chain of authorization certificates, and verifying the chain of authorization, wherein authenticating the third participant includes authenticating a type of operation to be performed by the third participant.

5. The system of claim 4, wherein the security module is further modified to verify the chain of authorization certificates.

6. A machine-readable storage medium having stores thereon instructions which, when executed by a machine, cause the machine to:
    building an authorization certificate;
    issue the authorization certificate to a plurality of participants to re-delegate the access authority, each of the plurality of participants including a computer system;
    at each re-delegation, establish a chain of authorization certificates, wherein establishing the chain of authorization certificates includes communicating a first authorization certificate between a first participant and a second participant, the first participant delegating the access authority to the second participant, determining re-delegation authority of the second participant, creating a second authorization certificate permitting the second participant to re-delegate the access authority to a third participant, and communicating the first and the second authorization certificates between the second participant and the third participant, the second participant delegating the access authority to the third participant;
    receive an access request for the protected resources; and
    verify the access request for the protected resources, wherein verifying includes authenticating the third participant providing the access request, receiving the chain of authorization certificates, and verifying the chain of authorization, wherein authenticating the third participant includes authenticating a type of operation to be performed by the third participant.

7. The machine-readable storage medium of claim 6, wherein the type of operation includes at least one of a read-and-write operation, a read-only operation and a write-only operation, on the protected resources.

* * * * *